United States Patent
Towriss

(10) Patent No.: US 11,854,024 B2
(45) Date of Patent: *Dec. 26, 2023

(54) SYSTEMS AND METHODS FOR INTERACTIVE ANNUITY PRODUCT SERVICES USING MACHINE LEARNING MODELING

(71) Applicant: Daniel J. J. Towriss, Indianapolis, IN (US)

(72) Inventor: Daniel J. J. Towriss, Indianapolis, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/394,318

(22) Filed: Aug. 4, 2021

(65) Prior Publication Data

US 2021/0365967 A1     Nov. 25, 2021

Related U.S. Application Data

(63) Continuation of application No. 15/371,999, filed on Dec. 7, 2016, now Pat. No. 11,113,704.

(60) Provisional application No. 62/264,163, filed on Dec. 7, 2015.

(51) Int. Cl.
    G06Q 30/0202   (2023.01)
    G06Q 30/0201   (2023.01)
    G06Q 30/0601   (2023.01)
    G06N 20/00     (2019.01)

(52) U.S. Cl.
    CPC ........ *G06Q 30/0202* (2013.01); *G06N 20/00* (2019.01); *G06Q 30/0201* (2013.01); *G06Q 30/0631* (2013.01)

(58) Field of Classification Search
    CPC .................................................. G06Q 30/0202
    See application file for complete search history.

(56) References Cited

U.S. PATENT DOCUMENTS

| 7,590,581 | B1 | 9/2009 | Payne et al. |
| 7,860,773 | B1 | 12/2010 | Golden |
| 2002/0147670 | A1 | 10/2002 | Lange |

(Continued)

OTHER PUBLICATIONS

Iulian Mircea et al, Some mathematical models for longevity risk in the annuity market and pension funds, Procedia Economics and Finance 15 ( 2014 ) 115 -122 (Year: 2014).

(Continued)

*Primary Examiner* — Andre D Boyce
(74) *Attorney, Agent, or Firm* — Fox Rothschild LLP

(57) ABSTRACT

A server computing device generates an input data set by determining a set of user information, a set of market index information, and available annuity products. A machine learning processor executes a price optimization module to traverse a computer-generated annuity matching model and select a subset of the available annuity products that are associated with product characteristics that match user objectives and generate annuity product recommendations for the user. The processor executes a market simulation module to traverse a computer-generated annuity performance prediction model using the annuity product recommendations and predictions of market performance to generate simulated outcomes for each of the annuity products. A client device generates a graphical user interface for display to the user via a display device, the graphical user interface including visual representations of each of: the annuity product recommendations and the simulated outcomes.

29 Claims, 12 Drawing Sheets

(56) References Cited

U.S. PATENT DOCUMENTS

| | | |
|---|---|---|
| 2003/0083972 A1 | 5/2003 | Williams |
| 2004/0177022 A1 | 9/2004 | Williams et al. |
| 2005/0187851 A1 | 8/2005 | Sant |
| 2006/0074788 A1 | 4/2006 | Grizack et al. |
| 2006/0212380 A1 | 9/2006 | Williams et al. |
| 2007/0244777 A1 | 10/2007 | Torre et al. |
| 2009/0055327 A1 | 2/2009 | Jones et al. |
| 2009/0076980 A1 | 3/2009 | Ameriks et al. |
| 2009/0281959 A1 | 11/2009 | Abidi et al. |
| 2011/0264473 A1 | 10/2011 | Abreu et al. |
| 2012/0078813 A1 | 3/2012 | Rose et al. |
| 2012/0185407 A1 | 7/2012 | Scott et al. |
| 2014/0095372 A1 | 4/2014 | Nash et al. |
| 2014/0143175 A1 | 5/2014 | Greenshields et al. |
| 2016/0275616 A1 | 9/2016 | Nicholson et al. |
| 2017/0132706 A1 | 5/2017 | Kariv et al. |

OTHER PUBLICATIONS

Andrew J. G. Cairns et al, Modelling and management of mortality risk: a review, Scandinavian Actuarial Journal, 2008, 23, 79113 (Year: 2008).

Andrew JG Cairns, Modeling and Management of Longevity Risk, Wharton Pension Research Council Working Papers. 125 (Year: 2013).

FIG. 6

Enroll

Name: [First Name] [Last Name]
Social Security Number: xxx-xx-xxxx
Address: Street Address
Address
City [State ▼] [Zip]
Email: Email
Phone: (xxx) xxx-xxxx

} 602

[Submit] — 604

600

Needs Assessment

Life Stage: Accumulation — Consolidation — Spending — Gifting  
702

Link Account: ☑ Bank Account ☐ Investment Account  
Institution ▼

Product Size: $0,000.00 ▼

Term: 5-year ▼

Risk Preferences:  
Low — Medium — High  
No losses — Limited Losses — Unlimited Losses  
Guaranteed Upside — Flexible Upside — Unlimited Upside

Index Selections:

| Index | Weight |
|---|---|
| S&P 500 ▼ | 25% ▼ |
| Dow Jones ▼ | 75% ▼ |

Add Index ⊕

704

[Submit]

Insights

The following statements will help us gain a refined understanding of your product preferences. Please indicate the degree to which you agree or disagree with each of them.

"I value the possibility of greater upside potential over risk of losses."

Strongly Disagree — Disagree — Neither Agree nor Disagree — Agree — Strongly Agree "I am comfortable committing to a five year term."

Strongly Disagree — Disagree — Neither Agree nor Disagree — Agree — Strongly Agree "I will not need to use any of the funds in my account for at least ten years."

Strongly Disagree — Disagree — Neither Agree nor Disagree — Agree — Strongly Agree "I would like to have additional exposure to international stock market indices in my financial products."

Strongly Disagree — Disagree — Neither Agree nor Disagree — Agree — Strongly Agree

[Next]

FIG. 8

Product Recommendations

Based on the information you have provided, the following products have been designed uniquely for you.

For each of the products presented, you may now:

- Model: Discover the product performs under different market conditions
- Edit: Make changes to individual product features and see how your changes effect the other features.
- Buy: Purchase the product selected by agreeing to its terms and making a payment
- Rate: Rate the product to help us understand how well we did in designing it for you

Product

Indices: Equities Index xyz
Upside: ##% participation in index annual return, xx% cap
Risk Management: Floored return of ##%
Tenor: ## years
Income Benefit: Starting in year ##, $## per year for life — 902c — 902a

[Model] [Edit] [Buy] — 902b

Rate: ★★★☆☆

Product 2

Indices: Equities Index xyz
Upside: ##% participation in index annual return, xx% cap
Risk Management: Floored return of ##%
Tenor: ## years
Income Benefit: Starting in year ##, $## per year for life — 904c — 904a

[Model] [Edit] [Buy] — 904b

Rate: ★★★★★

[Next]

FIG. 9

Product Modeler

You are modeling Product 1.

Adjust potential market conditions to see how they affect the selected product. Each attribute may be altered individually, but some may cause others to change in tandem.

Potential Market Conditions {1002}

Condition A:
Condition B:
Condition C:
Condition D:
Condition E:

Product 1 Outcome {1004}

Back to Products

SYSTEMS AND METHODS FOR INTERACTIVE ANNUITY PRODUCT SERVICES USING MACHINE LEARNING MODELING

CROSS REFERENCE TO RELATED MATTERS

This application is a continuation of U.S. application Ser. No. 15/371,999, filed Dec. 7, 2016 (which issued as U.S. Pat. No. 11,113,704 on Sep. 7, 2021), which claims the benefit of U.S. Application No. 62/264,163, filed Dec. 7, 2015, and each of the foregoing applications are expressly incorporated by reference herein.

TECHNICAL FIELD

This application relates generally to methods and apparatuses, including computer program products, for interactive annuity product services using machine learning modeling.

BACKGROUND OF THE INVENTION

The life insurance industry offers retirement prod-ucts that allow for asset accumulation, in the form of deferred annuities. Deferred annuities are typically designed by the industry to have an accumulation phase followed by an optional annuitization phase. In a typical annuity pur-chase, a policyholder makes an upfront payment (sometimes a series of upfront payments) to the insurance company, which is tracked as the policyholder's account value. During the accumulation phase credits are made to the account value and these credits are not subject to current taxation.

In the case of a Fixed Guaranteed Annuity (GA), the policyholder's account value is credited at a fixed rate of return. The account value is guaranteed by the insurance company. In the case of a Fixed Index Annuity (FIA), the policyholder's account value is credited at a rate that is a function of changes in a market index selected by the policyholder, such as the S&P 500, over a particular period of time. A minimum annual rate of return, usually 0.0%, is guaranteed by the insurance company. In the case of a Variable Annuity (VA), the policyholder's account value is determined by the value of investments chosen by the policyholder and held by the insurance company in one or more sub-account. The insurance company does not guarantee any minimum account value or rate of return.

The state of the art of the annuity market is lacking, as will be discussed further herein, as current products have deficiencies such as being:

Inflexible;
Expensive (fee-ridden);
Opaque;
Limited in upside (accumulation) potential.

Fixed Index Annuity

Although credit rates for FIA products do vary with changes in a reference market index, the extent of this variation is significantly limited. For instance, an insurance company will typically set a cap on annual credited rates. These caps are set at very low levels relative to the potential returns of the market index, for example at 3.0%. In this example, the policyholder would earn a credited rate of between 0.0% and 3.0% in a given year, depending on the change in the market index. This is clearly a de minimis level of "index participation" and does not provide a material level of "market upside" potential (when compared to S&P 500 long term average annual returns of 8-10%). Furthermore, when compared to fixed rates of return offered by insurance companies on GA (1.5-2.5% guaranteed), there is limited incremental accumulation possibility available to policyholders buying FIA.

Additionally, since FIA credited rates are based on one-year market index changes, insurance companies selling FIAs have to engage in costly annual hedging (trading in market index derivatives) related to these products. Maintaining the hedges exposes the insurance company to income statement volatility, as accounting rules require that the hedge positions be marked to market. It is inefficient for insurance companies to suffer from this financial reporting volatility for a product that does not offer significant value to policyholders. Insurance company accounting forces insurance companies to value their hedge portfolio assets in a manner distinct from the valuation of the related liabilities, leading to increased and unnecessary volatility of insurance company surplus.

Fixed Guaranteed Annuity

In GA products, policyholders do not have any upside or equity participation potential. They are unable to allocate portions of accumulated gains to riskier strategies in order to create the possibility for higher returns. These options in GA products are simply not allowed by the applicable laws.

Variable Annuity

VA products do allow policyholders to take on additional risk in exchange for additional return potential, however VA products have numerous drawbacks, including confusing and unclear fee structures. VA products expose policyholders to downside risk unless policyholders pur-chase additional protections from the insurance company at an additional cost. These protections are rigid (i.e., cannot be easily customized to suit objectives) and are subject to opaque fees.

Deficiencies of Existing Methodologies and Systems

Current art annuities fail to provide transparent products that allow policyholders to customize and change risk profile as their needs evolve over different life stages, while also providing meaningful potential for accumulation and upside. Current art annuities have built-in risk manage-ment features that purport to protect policyholders. How-ever, these features cannot be chosen or modified by poli-cyholders. Furthermore, the cost of these features is not transparent and cannot be determined explicitly by the policyholder.

In current art annuities, existing annuities are administered in a rigid manner and a policyholder's options to modify either their risk exposure or the fees associated with their product are virtually non-existent. There is a fixed set of products and a small set of riders that are offered and each are priced separately with pre-set pricing. Policyhold-ers are locked into longer term inflexible and immutable contracts, even though it is likely that their circumstances and needs will change during the life of the annuity contract. The main option available to policyholders who need to make a change is early surrender of their annuities. Early surrender leads to costly penalties and thus causes immedi-ate losses to policyholders. In addition, any alternative product that the policyholder chooses as a replacement for the original annuity will be similarly inflexible and suboptimal.

Furthermore, existing computing systems-even systems with advanced processing capabilities—that handle functions such as user-facing needs assessment, price optimization, market performance and portfolio simulation in the context of annuity management typically match users in a linear fashion to existing pre-configured products. Such systems do not leverage more sophisticated software-based data processing techniques that can only be performed by specialized computers, such as machine learning and artificial intelligence.

SUMMARY

The subject disclosure relates to systems for cre-ating and offering annuities that are a hybrid between today's fixed index annuity and today's variable annuity. This offering provides for an annuity with a wide array of use-selectable investment choices (in index form) along with a flexible risk management design that enables the policy-holder to optimize objectives for the annuity in a straight-forward design that can change over time as the policyhold-er's risk appetite changes.

The new product is preferably a fixed index annuity that offers:
1. Access to market-leading investment strategies delivered as a menu of indexing alternatives;
2. Lifecycle Risk Management: the versatility to select the precise level of risk and to change the selection over time;
3. Transparent fee design where policyholders know what they are paying for and only pay for the risk management options that they desire.

The present system relates to improvements to existing systems for offering, managing, and administering annuities. Annuity companies have for many years imple-mented computer systems (which are sometimes networked with internal and external systems) that manage and admin-ister annuities which were issued to its customers (the policy-holders). These systems can include complex software components that are implemented on computer hardware (and networks) to provide the management and administra-tion of annuities. Software that configures the hardware is stored in non-volatile memory such as a hard drive or other memory device to operate the system. These existing sys-tems, as explained above, will include features for managing risk, individual annuity accounts, financial payments, and investments by the annuity company in support of its annuity obligations and related risks. According to embodi-ments of the present invention, these existing systems are modified or a new system is implemented that applies software, hardware, and related data to effectuate the new annuity design (and related variations) that are described herein. The fol-lowing sections first describe a particular annuity design that is provided by the system and next provide additional discussion about the system, features of the system, and overall considerations. Thereafter, an initial claim section is provided but it is to be understood that other claims are evident and understood from the present description.

In addition, the machine learning techniques described herein provide the advantage of generating a large set of potential permutations of product features that are tailor-made to a specific customer. The techniques provide a robust process of probing the needs of a customer to fully understand their objectives, risk tolerances, fee constraints, and other factors, independent of any product recommen-dation. The techniques then leverage a product/price opti-mization phase that considers every possible permutation of product attributes to arrive at a few recommendations that are both feasible (i.e., the insurance company can issue on those terms) and which maximize compatibility with a user needs profile. It should be understood that the techniques advan-tageously enable pricing to be performed non-linearly 'on the fly' (e.g., more complex than simply adding up a few rider fees).

The invention, in one aspect, features a system compris-ing a server computing device communicably coupled to a database computing device and having a machine learning processor. The server computing device is programmed to generate an input data set by: determining a set of user information associated with a user, including user demo-graphics, user risk preferences, and user objectives; deter-mining a set of market index information, including histori-cal market index information, current market index information, and forecast market index information; and determining one or more available annuity products using the set of user information. The machine learning processor is configured to execute a price optimization module to traverse a computer-generated annuity matching model using the input data set to select a subset of the available annuity products that are associated with product character-istics that match one or more of the user objectives and generate one or more annuity product recommendations for the user based upon the subset of annuity products. The machine learning processor is configured to execute a mar-ket simulation module to traverse a computer-generated annuity performance prediction model using the subset of annuity products selected by the price optimization module and one or more predictions of market performance, the market simulation engine generating one or more simulated outcomes for each of the annuity products in the subset of annuity products. The system further comprises a client computing device communicably coupled to the server computing device. The client computing device is config-ured to generate a graphical user interface for display to the user via a display device, the graphical user interface includ-ing one or more visual representations of each of: the one or more annuity product recommendations and the one or more simulated outcomes.

The invention, in another aspect, features a method. A server computing device communicably coupled to a data-base computing device and having a machine learning processor generates an input data set by: determin-ing a set of user information associated with a user, includ-ing user demographics, user risk preferences, and user objectives; determining a set of market index information, including historical market index information, current mar-ket index information, and forecast market index informa-tion; and determining one or more available annuity prod-ucts using the set of user information. The machine learning processor executes a price optimization module to traverse a com-puter-generated annuity matching model using the input data set to select a subset of the available annuity products that are associated with product characteristics that match one or more of the user objectives and generate one or more annuity product recommendations for the user based upon the subset of annuity products. The machine learning processor executes a market simulation module to traverse a computer-generated annuity performance prediction model using the subset of annuity products selected by the price optimization module and one or more predictions of market performance, the market simulation engine generating one or more simu-lated outcomes for each of the annuity products in the subset of annuity products. A client computing device communi-cably coupled to the server computing device generates a graphical user interface for display to the user via a display device, the graphical user interface including one or more visual representations of each of: the one or more annuity product recommendations and the one or more simulated outcomes.

Any of the above aspects can include one or more of the following features. In some embodiments, the input data set is generated by retrieving at least a portion of the user information, market index information, and available annuity products from an external data source. In some embodiments, the server computing device is further con-figured to receive at least a portion of the user information from the user. In some embodiments, the server computing device is further configured to execute, by the machine learning processor, a user needs assessment module to traverse a computer-generated user insight analysis model using the user information, the user needs assessment mod-ule generating one or more expected user attributes. In some embodiments, the server computing device is further configured to transmit the one or more expected user attributes to the client computing device for display to the user. In some embodiments, the server computing device is further configured to receive a response to the one or more expected user attributes from the client computing device and re-execute the user needs assessment module using the received response to adjust one or more of the expected user attributes.

In some embodiments, the graphical user interface includes one or more input controls to enable interaction with and manipulation of the one or more visual representations by the user of the client computing device. In some embodiments, server computing device is further configured to build, by the machine learning processor, the computer-generated annuity matching model by training a machine learning algorithm programmed on the machine learning processor against a training data set. In some embodiments, the server computing device is further configured to build, by the machine learning processor, the computer-generated annuity prediction performance model by training a machine learning algorithm programmed on the machine learning processor using the input data set.

In some embodiments, the product characteristics are reference market indices, participation rate, downside protection, commitment term, income benefits, and fees. In some embodiments, the user risk preferences include a risk tolerance. In some embodiments, the machine learning processor returns the generated one or more annuity product recommendations to the price optimization module as input to update the computer-generated annuity matching model.

In some embodiments, the machine learning pro-cessor returns the generated one or more simulated out-comes to the market simulation module as input to update the computer-generated annuity performance prediction model. In some embodiments, the one or more predictions of market performance include at least one prediction of market performance received from the client computing device as input by the user. In some embodiments, the one or more predictions of market performance correspond to a perfor-mance of one or more market indices. In some embodi-ments, the one or more simulated outcomes for each of the annuity products correspond to an expected rate of return for the annuity product.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunc-tion with the accompanying drawings. The drawings are not neces-sarily to scale, emphasis instead generally being placed upon illustrating the principles of the invention.

FIG. 6 depicts an exemplary graphical user interface for the purposes of face for the purposes of creating a user account and user profile.

FIG. 7 depicts an exemplary graphical user interface for the purposes of collecting user needs assessment input.

FIG. 8 depicts an exemplary graphical user interface for the purposes of presenting user insights and col-lecting user feedback on the insights.

FIG. 9 depicts an exemplary graphical user interface for the purposes of displaying annuity product recom-mendations.

FIG. 10 depicts an exemplary graphical user interface for the purposes of displaying a simulated outcome for a par-ticular annuity product recommendation.

DETAILED DESCRIPTION

Figure 1:
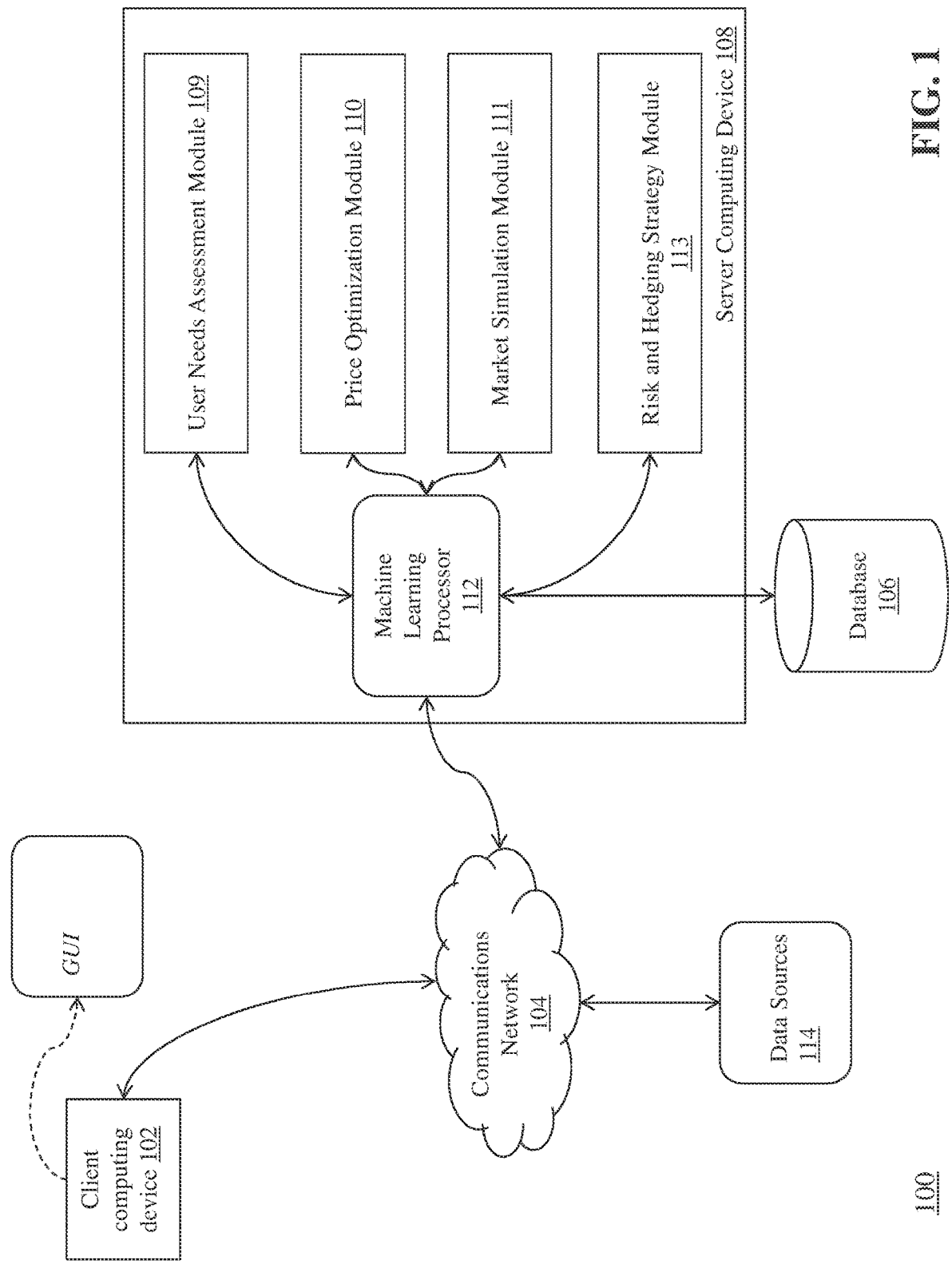
FIG. 1 is a block diagram of a system used in a computing environment for generating annuity product rec-ommendations and risk strategies using a machine learning processor.

FIG. 1 is a block diagram of a system 100 used in a computing environment for generating annuity product rec-ommendations and risk strategies using a machine learning processor (e.g., processor 112). The system 100 includes a client computing device 102, a communications network 104, a database 106, a server computing device 108 having a specialized machine learning processor 112 that executes a user needs assessment module 109, a price optimization module 110, a market simulation module 111, a risk and hedging strategy module 113, and one or more data sources 114.

The client computing device 102 connects to the com-munications network 104 in order to communicate with the server computing device 106 to provide input and receive output relating to the process of generating annuity product recommendations and risk strategies using a machine learn-ing processor as described herein. For example, client com-puting device 102 can be coupled to a display device that presents a detailed graphical user interface (GUI) with output resulting from the analysis methods and systems described herein, where the GUI is utilized by an operator to review the output generated by the system. In addition, the client computing device 102 can be coupled to one or more input devices that enable an operator of the client device to provide input to the other components of the system for the purposes described herein.

Exemplary client devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client device 102, it should be appreciated that the system 100 can include any number of client devices. And as mentioned above, in some embodiments the client device 102 also includes a display for receiving data from the server computing device 108 and displaying the data to a user of the client device 102.

The communication network 104 enables the other components of the system 100 to communicate with each other in order to perform the process of generating annuity product recommendations and risk strategies using a machine learning processor as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The database 106 is a computing device (or in some embodiments, a set of computing devices) that is coupled to the server computing device 108 and is configured to receive, generate, and store specific segments of data relating to the process of generating annuity product recommendations and risk strategies using a machine learning processor as described herein. In some embodiments, all or a portion of the database 106 can be integrated with the server computing device 108 or be located on a separate computing device or devices. For example, the database 106 can comprise one or more databases, such as MySQL™ available from Oracle Corp, of Redwood City, Calif.

The server computing device 108 is a combination of hardware, which includes a specialized machine learning processor 112 and one or more physical memory modules, and specialized software modules 109, 110, 111, 113 that execute on the machine learning processor 112 of the server computing device 108, to receive data from other components of the system 100, transmit data to other components of the system 100, and perform functions for generating annuity product recommendations and risk strategies using a machine learning processor as described herein.

The machine learning processor 112 and the corresponding software modules 109, 110, 111, and 113 are key components of the technology described herein, in that these components 109-113 provide the beneficial technical improvement of enabling the system 100 to automatically process and analyze large sets of complex computer data elements using a plurality of computer-generated machine learning models to generate user-specific actionable output relating to the selection and optimization of annuity products. The machine learning processor 112 and modules 109, 110, 111, and 113 execute artificial intelligence algorithms to constantly improve the machine learning models by automatically assimilating newly-collected data elements into the models without relying on any manual intervention. In addition, the machine learning processor 112 enables the rapid analysis of a large number of market performance scenarios (typically on the order of tens of thousands of scenarios) in conjunction with specifically-constructed risk attributes, a function that both necessitates the use of a specially-programmed microprocessor and that would not be feasible to accomplish using general-purpose processors and/or manual techniques.

The machine learning processor 112 is a microprocessor embedded in the server computing device 108 that is configured to retrieve data elements from the database 106 and the data sources 114 for the execution of the user needs assessment module 109, the price optimization module 110, and the market simulation module 111. The machine learning processor 112 is programmed with instructions to execute artificial intelligence algorithms that automatically process the input and traverse computer-generated models in order to generate specialized output corresponding to each of the modules 109, 110, 111, and 113. The machine learning processor 112 can transmit the specialized output to downstream computing devices for analysis and execution of additional computerized actions.

The machine learning processor 112 uses a variety of models to achieve the objectives described herein. In both the model training and model operation phases, the first step performed by the machine learning processor 112 is a data preparation step that cleans the structured and unstructured data collected. Data preparation involves eliminating incomplete data elements or filling in missing values, constructing calculated variables as functions of data provided, formatting information collected to ensure consistency, data normalization or data scaling and other pre-processing tasks.

In the training phase, initial data processing may lead to a reduction of the complexity of the data set through a process of variable selection. The process is meant to identify non-redundant characteristics present in the data collected that will be used in the computer-generated analytical models. This process also helps determine which variables are meaningful in analysis and which can be ignored. It should be appreciated that by "pruning" the dataset in this manner, the system achieves significant computational efficiencies in reducing the amount of data needed to be processed and thereby effecting a corresponding reduction in computing cycles required.

In addition, in some embodiments the machine learning models include a class of models that can be summarized as supervised learning or classification, where a training set of data is used to build a predictive model that will be used on "out of sample" or unseen data to predict the desired outcome. In one embodiment, the linear regression technique is used to predict the appropriate categorization of a customer based on input variables. In another embodiment, a decision tree model can be used to predict the appropriate classification of customer. Clustering or cluster analysis is another technique that may be employed, which classifies data into groups based on similarity with other members of the group.

The machine learning processor 112 can also employ non-parametric models. These models do not assume that there is a fixed and unchanging relationship between the inputs and outputs, but rather the computer generated model automatically evolves as the data grows and more experience and feedback is applied. Certain pattern recognition models, such as the k-Nearest Neighbors algorithm, are examples of such models.

Furthermore, the machine learning processor 112 develops, tests and validates the computer-generated models described herein iteratively according to the step highlighted above. For example, the processor 112 scores each model objective function and continuously selects the model with the best outcomes.

In some embodiments, the modules 109, 110, 111, and 113 are specialized sets of artificial intelligence-based software instructions programmed onto the dedicated machine learning processor 112 in the server computing device 108 and can include specifically-designated memory locations and/or registers for executing the specialized computer software instructions. Further explanation of the specific processing performed by the modules 109, 110, 111, and 113 will be provided below.

The user needs assessment module 109 collects a plurality of data elements that specifically pertain to the user for whom the system is generating annuity product recommendations and related performance information. For example, the user needs assessment module 109 can collect information such as unique user identifiers (e.g., name, date of birth, government ID number), demographic information (e.g., age, gender, address), an investment risk tolerance for the user, investment objectives of the user, market index preferences, and investment strategy and history. As will be described in greater detail below, the user needs assessment module 109 processes the user-related data elements through a computer-generated user insight analysis model to generate one or more user-specific insights—in conjunction with a multi-faceted data set as collated from a plurality of data sources 114—that can be then used to generate annuity product recommendations. The user needs assessment module 109 also conducts a process to refine the computer generated user-specific insights based upon automated feedback from data sources and related analysis previously performed by the module 109 and, in some embodiments, based upon user-provided responses that confirm and/or diverge from the computer-generated insights. As a result of this feedback process, the user needs assessment module 109 generates more accurate and customized input data elements which the module 109 then feeds back into the user insight analysis model to re-generate the output user insight data.

The price optimization module 110 collects the user-specific insights from the user needs assessment module 109 and, as will be described in greater detail below, processes the user-specific insights through a computer generated annuity matching model to generate one or more annuity product recommendations that are uniquely customized for the user based upon: user-specific criteria; historical market data and trends; historical product performance; and a roster of available (and/or potential) annuity products. The price optimization module 110 generates the product recommendations according to a framework of features that are assigned customized values that the module 110 predicts will satisfy the expected user needs, such as: investment features, risk management features, time commitment features, cost features, flexibility features, and other related features.

The market simulation module 111 collects the user-specific annuity product recommendations from the price optimization module 110 and, as will be described in greater detail below, processes the user-specific annuity product recommendations through a computer-generated annuity performance prediction model using a subset of annuity products selected by the price optimization module and predictions of future market performance (including, in some embodiments, predictions based upon hypothetical market conditions). The market simulation module 111 generates one or more simulated outcomes (e.g., rate of return, growth performance, and the like) for each of the annuity products in the subset of annuity products based upon the processing functions. In some embodiments, the market simulation module 111 generates a graphical user interface for display to the user on the client device 102 that enables the user to select from a variety of potential market performance scenarios according to, e.g., the user's desired risk threshold, and the module 111 integrates the user selected market performance scenarios into the outcome simulation process. The module 111 prepares a simulated outcome based upon each of the predictions of future market performance for each of the annuity product recommendations selected by the price optimization module 110. In some embodiments, the market simulation module 111 generates a graphical user interface for display on the client device 102 that presents the simulated outcomes to the user for comparison.

The risk and hedging strategy module 113 processes information about an annuity product selected and purchased by the user through a computer-generated risk quantification model to generate a user- and product-specific risk profile. Using the risk profile, the module 113 then determines one or more actions that may be required of the insurance company servicing the user's annuity product, in order for the company to fulfill the annuity-specific guarantees that were part of the product purchase. As an extension of this process, the risk and hedging strategy module 113 can use the generated risk profile as input to a computer generated hedge strategy development model to generate one or more investment strategies for the insurance company to use as hedges against the investment risk exhibited by the annuity product sold to the user. These investment hedge strategies are advantageous because they represent strategies that are specifically customized to the specific annuity products issued by the insurance company and can precisely account for the individualized risk involved in servicing those products.

The data sources 114 comprise a variety of databases, data feeds, and other sources that supply data to the machine learning processor 112 to be used in generating annuity product recommendations and risk strategies using a machine learning processor as described herein. The data sources 114 can provide data to the server computing device according to any of a number of different schedules (e.g., real-time, daily, weekly, monthly, etc.) The specific data elements provided to the processor 112 by the data sources 114 are described in greater detail below.

Further to the above elements of system 100, it should be appreciated that the machine learning processor 112 can build and train the above-identified computer-generated models prior to conducting the processing described herein. For example, the machine learning processor 112 can retrieve relevant data elements from the database 106 and/or the data sources 114 to execute algorithms necessary to build and train the computer-generated models (e.g., input data, target attributes) and execute the corresponding artificial intelligence algorithms against the input data set to find patterns in the input data that map to the target attributes. Once the applicable computer-generated model is built and trained, the machine learning processor 112 can automatically feed new input data (e.g., a user-specific input data set) for which the target attributes are unknown into the model using one or more of the modules 109, 110, 111, and 113. The machine learning processor 112 then executes the corresponding module 109, 110, 111, and 113 to generate predictions about how the user-specific data set maps to target attributes. The machine learning processor 112 then creates an output set based upon the predicted target attributes. It should be appreciated that the computer-generated models described herein are specialized data structures that are traversed by the machine learning processor 112 to perform the specific functions for generating annuity product recommendations and risk strategies as described herein. For example, in one embodiment, the models are a framework of assumptions expressed in a probabilistic graphical format (e.g., a vector space, a matrix, and the like) with parameters and variables of the model expressed as random components.

Finally, it should be appreciated that the techniques described herein are applicable to new customers who desire to purchase an annuity product, and to current annuity policyholders that want to advantageously view and adjust attributes of their annuity product in order to customize their investment based upon, e.g., changing life conditions, changing market conditions, changing investment objectives, and the like. The machine learning processor 112 and associated modules 109, 110, 111, and 113 can perform the described functions at any time during the annuity lifecycle and thus provide a flexible, interactive tool for annuity customer and policyholders to experience truly customized and unique product management.

Figure 2:
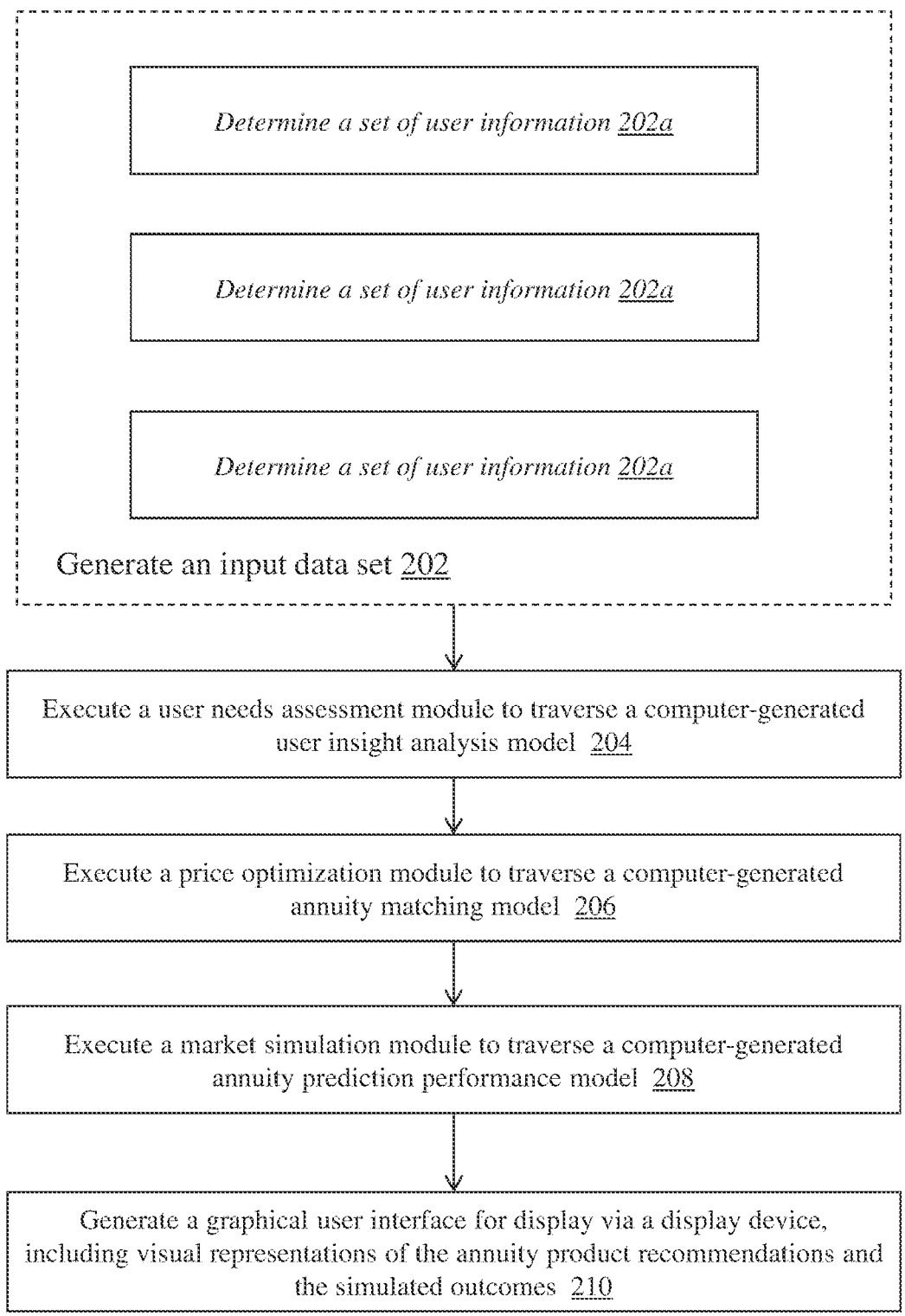
FIG. 2 is a flow diagram of a method for generating annuity product recommendations and risk strategies using a machine learning processor.

FIG. 2 is a flow diagram of a method for generating annuity product recommendations and risk strategies using the system 100 of FIG. 1, including the machine learning processor 112. The machine learning processor 112 generates (202) an input data set using the client computing device 102, the database 106 and/or the data sources 114. The machine learning processor 112 determines (202a) a set of user information associated with a user (e.g., a user of client device 102), including user demographics, user risk preferences, and user objectives. For example, a user at client device 102 can access a web application provided by server computing device 108 to initiate the process of reviewing available annuity products from an insurance company and purchasing one of the annuity products. As part of this process, the user can log into the web application (e.g., by providing user credentials such as a username and password) and the machine learning processor 112 can collect user specific information automatically from the database 106 and/or data sources 114. The user information can comprise data elements such as unique user identifiers, demographic information, risk tolerance information, risk and investment objectives, market index preferences, and investment strategy/history.

In one example, the machine learning processor 112 can generate and present one or more English-language questions to the user via a graphical user interface that request information. Beneficially, the machine learning processor 112 provides a series of questions that do not require specialized knowledge about investment, risk, market performance and the like to the user in order to develop and optimize a user profile to be used in the processes described herein. For example, the machine learning processor 112 determines risk tolerance information for the user that relates to the degree of risk that the user is willing to undertake and/or the degree of protection from risk that the user desires. To do this, the machine learning processor 112 generates a graphical user interface that allows prospective customers and current policyholders to select, in plain English, the degree of risk tolerance or risk protection that they desire. This feature provides a major improvement over the difficult to understand and inflexible risk parameters that current art computerized annuity systems offer. The machine learning processor 112 guides the user through a series of plain English questions that will allow the user to articulate his or her risk profile/preferences. Then, the machine learning processor 112 can offer and show different configurations of return possibilities and risk management features, with clearly disclosed pricing differences. For example, a question that the machine learning processor 112 can present to the user may be a series of statements from which the user chooses one that most fits his or her risk preferences, such as: "I am willing to put 3 years of annuity earning at risk in order to benefit from more upside participation in the S&P 500 index." The machine learning processor 112 associates the selected statement with a corresponding risk factor and inserts the risk factor into the user's risk profile as part of the user information.

Also, as part of the input data set generation, the machine learning processor 112 determines (202Z?) a set of market index information, including historical market index information, current market index information, and forecast market index information. For example, the market index information can include specific market index values, trends and changes in market indices over time, correlation of market index information to other economic conditions or factors (e.g., unemployment, GNP, and so forth). As will be described below, the machine learning processor 112 can use the collected market index information as part of the user needs assessment, annuity recommendation, risk quantification, and hedge strategy processes.

In addition, the machine learning processor 112 determines (202c) one or more available annuity products based upon the set of user information collected. In some embodiments, the machine learning processor 112 evaluates the user information against characteristics associated with a predefined catalog of annuity products (as provided by an insurance company data source) to determine whether one or more of the annuity products is applicable or available to the user. In some embodiments, the machine learning processor 112 generates a hybrid annuity product that may not directly correspond with an available annuity product but has certain features and characteristics optimized based upon the user information (e.g., a possible annuity product configuration). The machine learning processor 112 can use the set of available annuity products as part of the user needs assessment and annuity recommendation processes described herein.

Once the machine learning processor 112 has generated the input data set, the processor 112 executes (204) the user needs assessment module 109 to traverse a computer-generated user insight analysis model with the user information as input in order to generate one or more user-specific insights that relate to expected and/or desired attributes that a user would seek in an annuity product (e.g., with respect to risk tolerance, investment objectives, rate of return, market index preferences, and the like).

Figure 3:
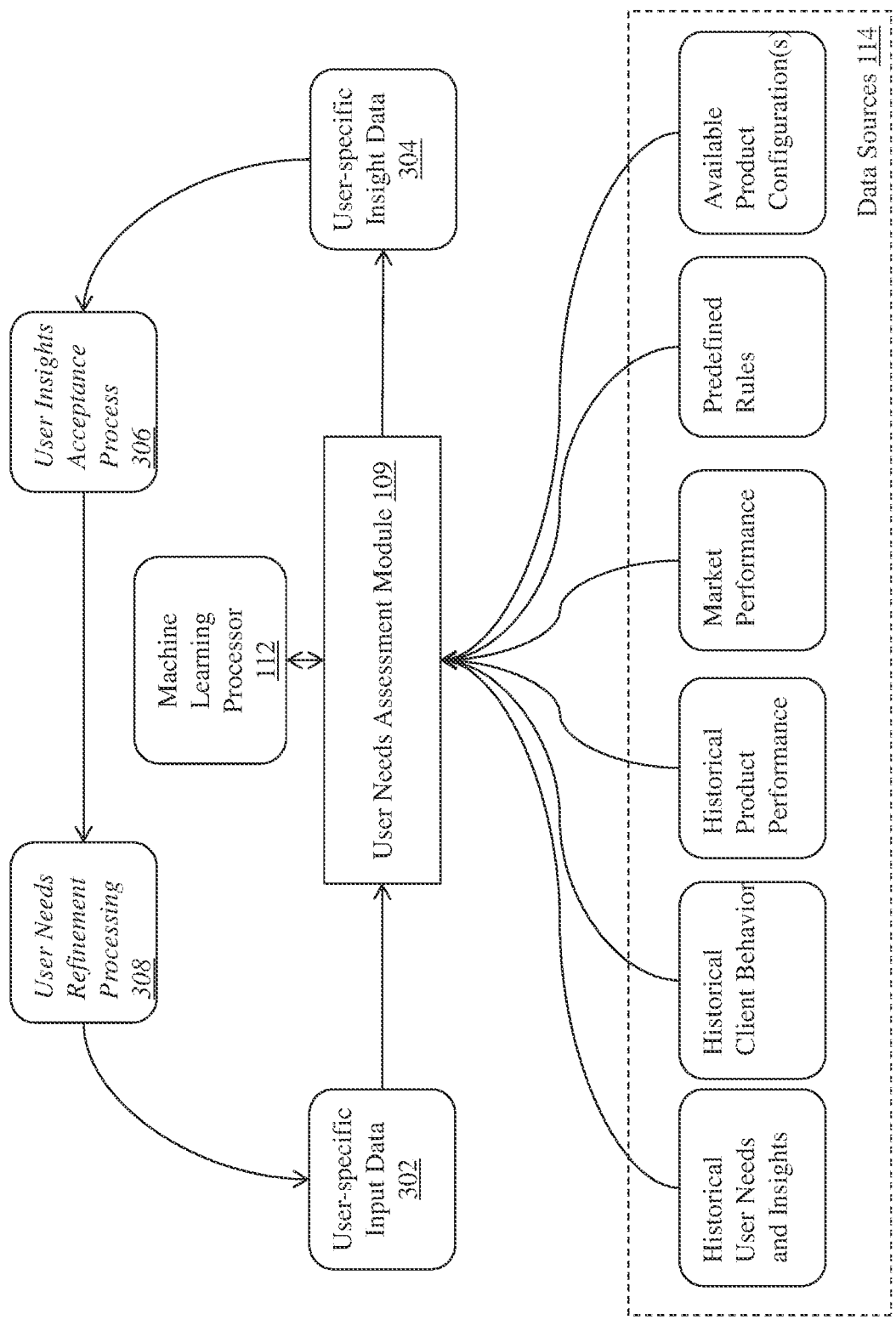
FIG. 3 is a workflow diagram of a method for generating user-specific insight data using a machine learn-ing processor executing a user needs assessment module.

FIG. 3 is a workflow diagram of a method for generating user-specific insight data using the system 100 of FIG. 1, specifically using the machine learning processor 112 to execute the user needs assessment module 109. The machine learning processor 112 initializes the user needs assessment module 109 with user-specific input data 302 (e.g., from the input data set). The machine learning processor 112 also collects specific input data elements from a variety of data sources 114, including historical user needs and insights (i.e., past outputs for the user as generated by the user needs assessment module 109), historical client behavior, historical annuity product performance, market performance (e.g., historical, current, projected), predefined rules, and one or more available annuity product configuration^). The machine learning processor 112 executes the artificial intelligence algorithms of the user needs assessment module 109 against the computer-generated user insight analysis model to generate user-specific insight data 304 (e.g., target attributes and predicted values for user needs based upon traversal of the model).

At this stage, in some embodiments, the machine learning processor 112 captures the user-specific insight data as output for the price optimization module 110 (as described below). In some embodiments, the machine learning processor 112 conducts an insight acceptance/needs refinement process to adjust the output set and provide more accurate user insight data. For example, the machine learning processor 112 executes a user insights acceptance process 306 to confirm the accuracy of the user insight data generated by the module 109. In one embodiment, the machine learning processor 112 presents the user insight data on a GUI associated with the client device 102, and the user can validate or reject the proposed insight data via user input. Next, the machine learning processor 112 receives the user feedback on the insight data and executes a user needs refinement process 308 to automatically adjust the existing user-specific input data (e.g., user objectives, investment strategies, risk tolerances, and so forth) and to generate additional user-specific input data to be used as an input data set for re-processing by the user needs assessment module 109. In this way, the machine learning processor 112 can continuously execute the user needs assessment process depicted in FIG. 3 in order to generate more accurate user-specific insights and to refine the computer-generated user insight analysis model for subsequent training and processing.

Turning back to FIG. 2, once the machine learning processor 112 has generated a set of accepted user-specific insight data, the machine learning processor executes (206) the price optimization engine 110 to traverse a computer generated annuity matching model to select a subset of the available annuity products that are associated with product characteristics that match one or more data elements that match the user-specific insight data and to generate one or more annuity product recommendations for the user that include a framework of specific matched features.

Figure 4:
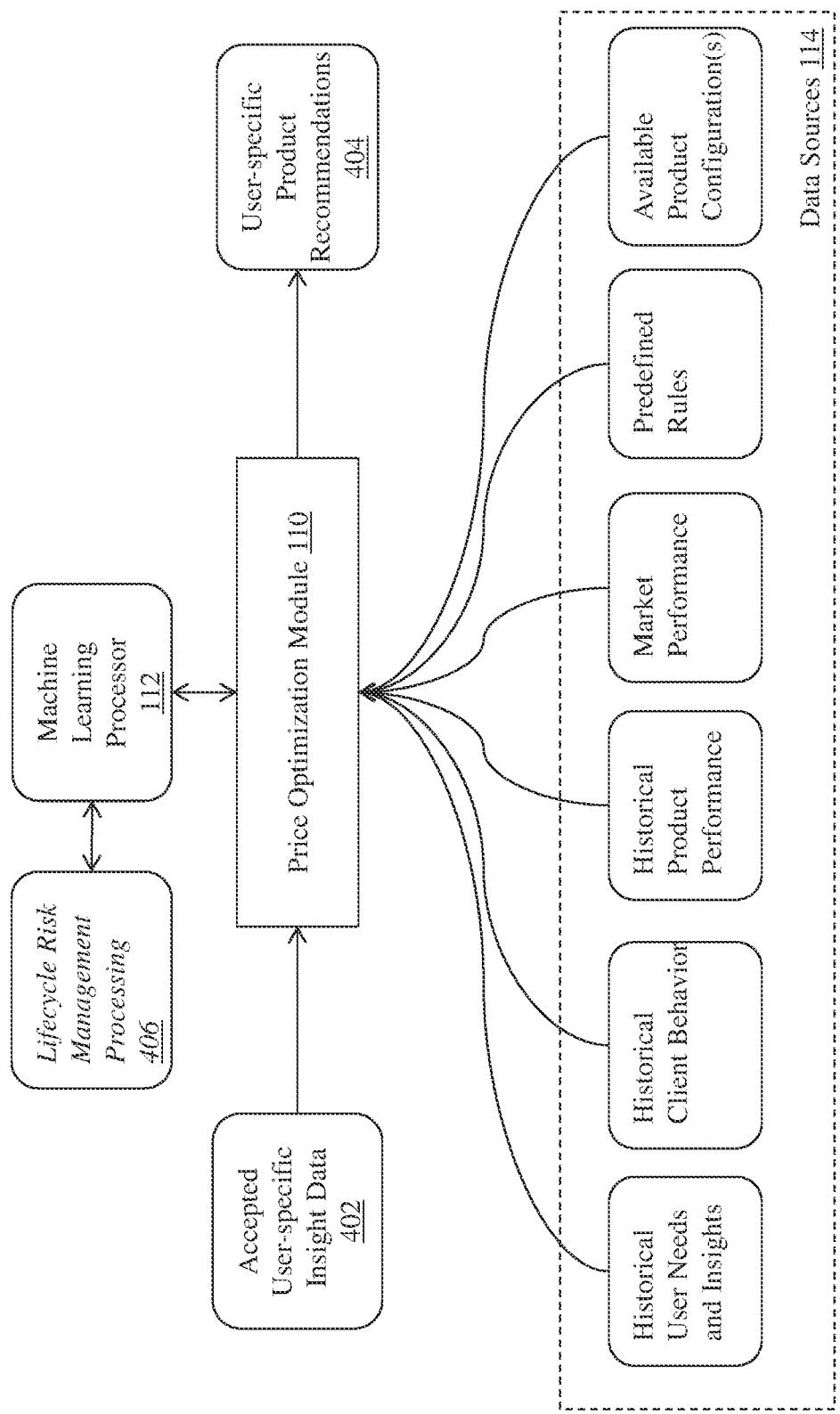
FIG. 4 is a workflow diagram of a method for generating user-specific product recommendations using a machine learning processor executing a price optimization module.

FIG. 4 is a workflow diagram of a method for generating user-specific product recommendations using the system 100 of FIG. 1, specifically using the machine learning processor 112 to execute the price optimization module 110. The machine learning processor 112 initializes the price optimization module 109 with the user-specific insight data 402 (e.g., from the user needs assessment module 109 output). The machine learning processor 112 also collects specific input data elements from a variety of data sources 114, including historical user needs and insights (i.e., past outputs for the user as generated by the user needs assessment module 109), historical client behavior, historical annuity product performance, market performance (e.g., historical, current, projected), predefined rules, and one or more available annuity product configuration(s). The machine learning processor 112 executes the artificial intelligence algorithms of the price optimization module 110 against the computer-generated annuity matching model to generate user-specific annuity product recommendation data 404 (e.g., target attributes and predicted values for annuity product recommendations specifically tailored to the user's needs based upon traversal of the model).

As part of the price optimization module 110 execution, the machine learning processor 112 integrates a lifecycle risk management process 406 into the annuity product recommendation determination. The lifecycle risk management process 406 comprises a series of algorithms and instructions that enable adjustment of risk management choices associated with the annuity products to beneficially provide a flexible and dynamic annuity modeling process. The lifecycle risk management process 406 provides practical and transparent risk management choices to the prospective annuity customer and the policyholder that can be changed as risk preferences vary by stage of life. As the need for investment certainty increases the risk control parameters in the policy can be changed.

For example, the policyholder may choose to increase the amount of guaranteed lifetime income to the annuity. Or the policyholder may choose to incorporate a minimum guaranteed accumulation value. The lifecycle risk management process 406 can provide the ability to select a desired risk management option. Typically, in the field of variable products, risk protection features such as principal protection are of limited availability. Also, in general, the range of options are also limited in annuity products. This is at least because the selection is made as part of executing the annuity contract and is locked into the annuity while in force. In addition, advanced risk protection techniques are only available at a product level such as by participating in a fund as opposed to an individual level (e.g., a user-selected risk management for that user's annuity).

Preferably, the machine learning processor 112 leverages the lifecycle risk management process 406 to provide the ability for a user to select a desired risk management option (from among different options)—during the annuity purchase process and at a point after the annuity is in-force. The machine learning processor 112 can provide this selection option at any time (e.g., on-demand) or can make the selection option available based on some other temporal criteria, such as daily or monthly.

The machine learning processor 112 can generate or support a GUI that provides interactive screens (e.g., via mobile or browser based interface) that permit the user to make these selections before and after the annuity is in force. The flexibility and user-managed features of the annuity can be very attractive to consumers. The system has underlying backend components that preferably determine available risk-selection options and presents those options to a user on an individualized basis.

As an additional feature of the lifecycle risk management process 406, the machine learning processor 112 can determine and display the cost of a risk management selection to the current user. For example, the machine learning processor 112 can generate a graphical user interface that displays risk management options and their associated costs (e.g., that the selection of risk management option #1 will involve a certain cost such as 0.2% annually of principal and earnings in the annuity). Other measures of cost may also be used such as a dollar amount. This way, the machine learning processor 112 clearly communicates the impact of a risk protection selection to the user. Also, depending on the risk management option, the cost can be customized or individualized to that annuity.

The user-specific product recommendations generated by the machine learning processor 112 via the price optimization module 110 are associated with a number of different features that define and differentiate the specific annuity products. For example, the user-specific product recommendations can include features such as: investment features (e.g., which indices the annuity product provides or allows for investment, the upside of the product); risk management features (e.g., caps, floors, guarantees, curves); time commitment features (e.g., policy durations, minimum investment or purchase length); cost features; flexibility features; and other such features.

Turning back to FIG. 2, once the machine learning processor 112 has determined the set of annuity product recommendations as set forth above, the machine learning processor 112 executes (208) the market simulation module 111 to traverse a computer-generated annuity performance prediction model using: the subset of annuity products selected by the price optimization module 110; and one or more predictions of market performance.

Figure 5:
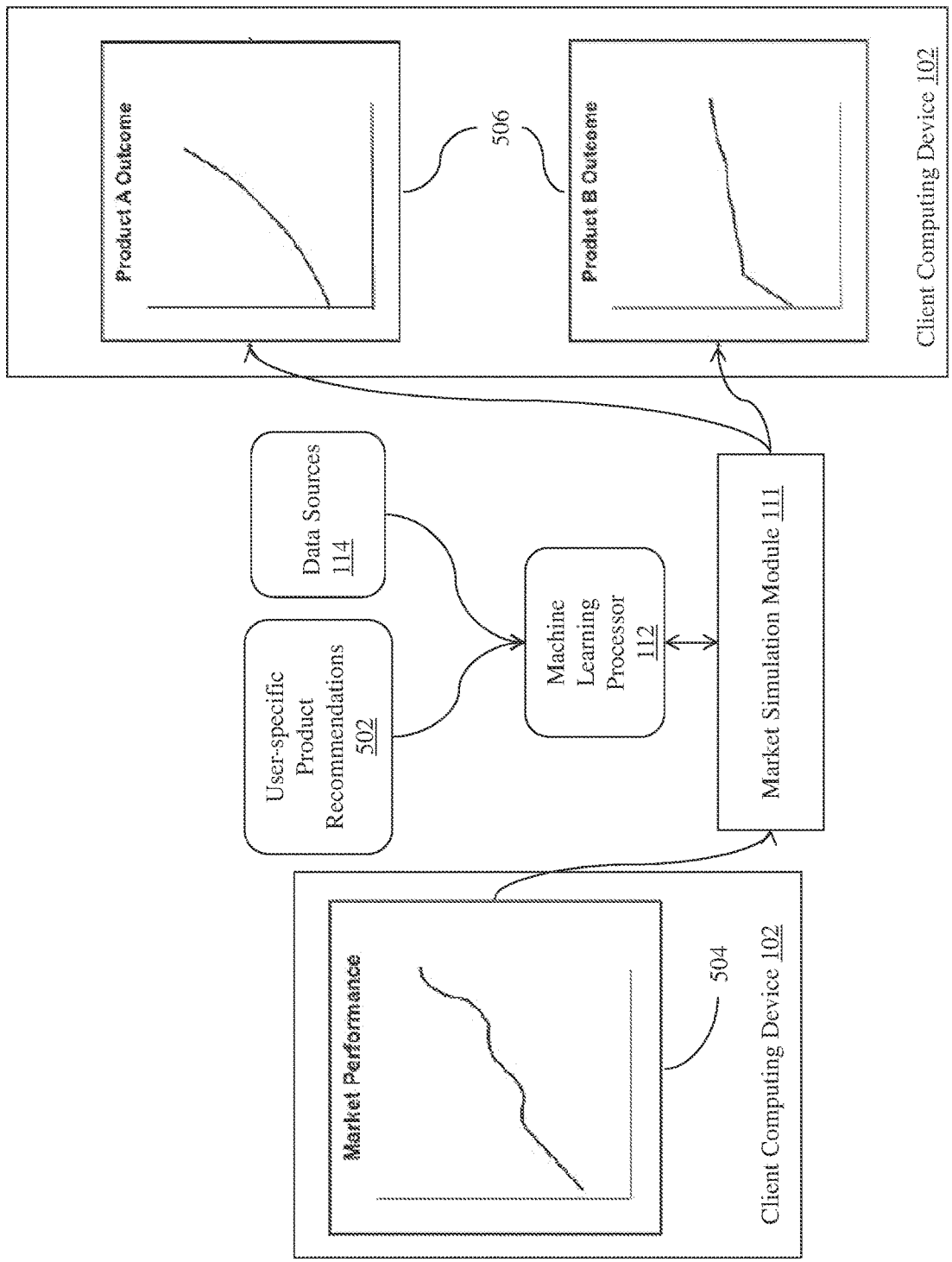
FIG. 5 is a workflow diagram of a method for generating user-specific and product-specific simulated outcomes for annuity product recommendations.

FIG. 5 is a workflow diagram of a method for generating user-specific and product-specific simulated outcomes for annuity product recommendations using the system 100 of FIG. 1, specifically using the machine learning processor 112 to execute the market simulation module 111. The machine learning processor 112 initializes the market simulation module 111 with the user-specific product recommendations 502 (e.g., from the price optimization module 110 output). In some embodiments, the machine learning processor 112 requests one or more market performance prediction values (e.g., prediction 504) from the client computing device 102. For example, the machine learning processor 112 can present one or more future market performance scenarios (e.g., weak performance, normal performance, strong performance) to a user at client device 102. In one embodiment, the one or more future market performance scenarios for selection by the user are displayed as market index graphs that depict the market performance over time. The machine learning processor 112 receives the market performance prediction values from the client computing device 102 for integration with the input for the market simulation module 111.

The machine learning processor 112 also collects specific input data elements from a variety of data sources 114, including historical annuity product performance, market performance (e.g., historical, current, projected), and predefined rules. The machine learning processor 112 executes the artificial intelligence algorithms of the market simulation module 111 against the computer-generated annuity performance prediction model to generate one or more simulated outcomes 506 for each of the annuity products selected by the price optimization module 110 (e.g., target attributes and predicted values for annuity product simulated future outcomes based upon traversal of the model). As shown in FIG. 5, the simulated outcomes 506 are individualized for specific annuity products selected by the price optimization engine 110 and reflect simulated outcomes for the annuity products based upon certain future market performance predictions/assumptions.

In one embodiment, the machine learning processor 112 generates (210) a graphical user interface to display the annuity product recommendations from the price optimization engine 110, and display the simulated outcomes 506 on the client device 102 (e.g., as line graphs depicting the simulated performance of the respective annuity products). In this embodiment, the graphical user interface can display the graphs in a form suitable for evaluation and comparison by a user of the client device 102. It should be appreciated that the graphical user interface can display the simulated outcome performance of the annuity in conjunction with the selected index and risk management options. This is a valuable tool because the cumulative effect of the risk management option and its related cost may not be evident to a user without complex calculations that are not typically available to consumers. For example, information about a 1% cost for a risk protection feature that is iteratively applied every year and its relationship to gains or losses of an index may be easy to understand at a very basic level for a single year but the long term impact is difficult to project for individuals. The graphical user interface generated by the machine learning processor 112 in this step, therefore, provides a valuable self-enabling tool that permits the user to make informed decisions about strategy for the annuity.

Exemplary Use Case

The following section is an exemplary use case of the process of generating annuity product recommendations using the system 100 of FIG. 1. A user at client computing device 102 establishes a connection with a web application executing on server computing device 108 (e.g., via browser). The user logs into the web application (e.g., using previously-created user credentials) or creates a user profile if the user is new to the application. FIG. 6 depicts an exemplary graphical user interface 600 generated by the server computing device 108 and displayed on the client device 102 for the purposes of creating a user account and user profile. As shown in FIG. 6, the graphical user interface 600 includes input fields 602 for the user to provide data elements such as name, SSN, address, email and phone number. Once the user clicks the submit button 604, the server computing device 108 creates a user account and baseline user profile.

The web application, in conjunction with the machine learning processor 112, then launches a needs assessment questionnaire and displays a corresponding user interface on the client device 102. The needs assessment questionnaire includes a series of data input elements (including, in some cases, optional data input elements) relating to topics such as: user behavioral information (e.g., risk tolerance, savings vs. spending prioritization), demographic data (e.g., age, gender, marital status, # of dependents, employment, and the like), investment objectives (e.g., statements with a set of responses ("Strongly Agree," "Strongly Disagree," etc.) for the user to rank his or her agreement or disagreement, in order to understand the user's preferences and objectives). The questionnaire may also include freeform text fields for the user to input customized information. FIG. 7 depicts an exemplary graphical user interface 700 generated by the server computing device 108 and displayed on the client device 102 for the purposes of collecting user needs assessment input. As shown in FIG. 7, the graphical user interface 700 includes data input elements such as sliders 702 and drop-down input boxes 704 that enable the user to provide input such as risk preferences, life stage, index selections and weights, product size, term, and linked accounts.

Following the needs assessment questionnaire, the user grants the web application access to the user's asset related information, such as financial accounts (e.g., account types, account balances, transaction history), real property, personal property, and so forth—as well as the user's liabilities (e.g., revolving debt, mortgage debt, alimony payments, etc.). In one example, this asset-related information is obtained from the data sources 114. As part of the data collection process, the machine learning processor 112 can reconfigure or reformat the asset-related information so that the information can be efficiently assimilated into the machine learning models as described above. For example, many years of the user's historical financial and asset-related data can be summarized into a set of variables such as: account type, average balance(s) over time, number of transactions per period, types of transactions (e.g., stock trades vs. deposits vs. consumer spending, and so forth). As a point of comparison, in traditional annuity systems, this type of asset-related data is typically collected manually (e.g., by a financial advisor) but advantageously the system 100 described herein can access and collect the asset-related data automatically, perform complex data mining and modeling on the information (e.g., using the machine learning processor 112) in order to discern meaningful patterns in the data that are used in profiling).

Next, the machine learning processor 112 validates the responses to the questionnaire provided by the user in association with the asset-related data that was obtained automatically. For example, the machine learning processor 112 can identify inconsistencies between the two sets of data (e.g., the user's self-reported spending habits do not align with the transaction histories for that user's financial accounts) and ask the user at client device 102 for clarification and/or additional data.

Once the machine learning processor 112 has completed validating the user's data set (e.g., questionnaire responses and asset-related data), the machine learning processor 112 executes the modules 109, 110, 111 described above to "categorize" the user in the computer-generated models across many dimensions. For example, each computer-generated model is trained using a coarse and simplistic segmentation of customer types based on expert data (e.g., from financial advisors), analysis of existing customers, industry standards (as obtained from data sources 114), and/or customer self-identification. It should be appreciated that each segment has certain distinguishing features and the machine learning processor 112 can traverse the computer generated models in order to assign probabilistically a new customer into a specific segment (i.e., into which segment is the customer most likely to fit?).

The machine learning processor 112 then generates an initial user profile based upon the categorization described above. Using the user needs assessment module 109, the machine learning processor 112 generates a graphical user interface containing one or more user insights that are consistent with a user having the same or similar user profile. FIG. 8 depicts an exemplary graphical user interface 800 generated by the server computing device 108 and displayed on the client device 102 for the purposes of presenting user insights and collecting user feedback on the insights. As shown in FIG. 8, the insights 802 are a series of statements on an agree/disagree spectrum and the user at client device 102 can select the option along the spectrum that best matches his or her agreement with each statement. In other embodiments, the insights can include true/false questions, and in some cases, the GUI includes an accept/reject option for the entire set of insights. As shown in FIG. 8, some exemplary user insights include, but are not limited to:

"I value the possibility of greater upside potential over risk of losses;"
"I am comfortable committing to a five year term;"
"I do not need to use any of the funds in my account for at least ten years;"
"I would like to have additional exposure to international stock market indices in my financial products;"

If the user rejects the insights (or submits answers that are inconsistent with expectations that the machine learning processor 112 has generated based upon the model traversal), the machine learning processor can conduct the user needs refinement process 308 as described with respect to FIG. 3 above. If the user accepts the user insights, the machine learning processor 112 creates a user profile and incorporates the insights into the profile. It should be appreciated that the feedback loop described in FIG. 3 (i.e., continuously collecting data and returning user insights) provides the technical advantage of incremental improvement to the predictive machine learning process and the computer-generated model of profiling/categorizing users and their needs. Over time, the machine learning processor 112 creates more granular segments of user categories/profiles into the model, for an even more multi-faceted and dimensional model.

Next, the machine learning processor 112 feeds the user profile from the user needs assessment module 109 as input into execution of the price optimization module 110, as described previously. The outcome of this step of the process is generating a bespoke annuity product with a customized set of features that is both feasible for the insurance company to issue (e.g., in terms of product offering, risk level, and the like) and which is most likely to meet the user's needs as expressed in the user profile. The machine learning processor 112 trains the computer-generated annuity matching model based upon observed product choices of existing customers and, in some embodiments, based upon advice of experts and associated business rules. The machine learning processor 112 further analyzes market conditions (e.g., market index levels, volatility, interest rates, etc.), the insurance company's real-time risk exposure and the expected product profitability to dynamically price the possible features of the annuity, accounting for: i) the non-linear interactions caused by combinations of features, ii) the risk tolerance of the insurance company, and iii) the company's profit targets. It should be appreciated that execution of the price optimization module 110 and traversal of the computer-generated annuity matching model is focused on finding an annuity product that most closely addresses the needs captured in the user profile, which also has low costs and is feasible and profitable for the insurance company to issue.

The machine learning processor 112 generates a graphical user interface containing one or more annuity product configurations as output from execution of the price optimization engine 110. FIG. 9 depicts an exemplary graphical user interface 900 generated by the server computing device 108 and displayed on the client device 102 for the purposes of displaying annuity product recommendations. As shown in FIG. 9, the graphical user interface 900 depicts a plurality of annuity product configurations 902, 904. Each configuration 902, 904 is comprised of a granular description of the product feature set 902a, 904a respectively, such as: tenor, index(es), upside participation formula, risk management features, guaranteed return, income benefits, fees, and the like. The user can then select from several different actions with respect to the product configurations 902, 904 such as: modeling the configuration, editing the configuration, or buying the configuration—each action is associated with a corresponding button (e.g., button sets 902a, 902Z? respectively). The user can also provide feedback about the presented annuity product configuration(s). For example, the user can indicate that the features for one or more of the product configurations does not meet his or her needs (e.g., by providing a rating 902c, 904c for each configuration). The machine learning processor 112 can receive the feedback from the client device 102 and use the feedback as further input to the price optimization module 110 for re-execution to determine other product configuration(s) that may more closely match the user's needs. It should be appreciated that the machine learning processor 112 can execute the price optimization module 110 and traverse the computer-generated annuity matching model many times until a product configuration is generated that is accepted by the user.

It should also be appreciated that the machine learning processor 112 can calibrate the computer-generated annuity matching model using the feedback obtained during this process. The types of feedback can include, but are not limited to: direct feedback (e.g., as obtained from the user via client device 102), customer abandonment (i.e., user failed to select a product configuration after being presented with several options, which could mean that there was an imperfect match between the user needs and proposed configurations). Feedback can also be obtained from post sale annuity changes—e.g., by giving the user the option to change annuity product features at many points during the life of the product, the system can determine whether the changes result from an imperfect initial match of the annuity product to user needs and/or a change in user needs over time.

Once the user has selected one or more of the potential product configurations, the machine learning processor 112 executes the market simulation module 111 and traverses the computer-generated annuity performance prediction model to generate the simulated outcomes for each product configuration. For example, the machine learning processor 112 processes the product configuration(s) through a series of stochastic market simulations (e.g., using different expected or predicted market conditions) to generate a detailed graphical view of possible evolutions of, e.g., account value in different future paths of market returns.

FIG. 10 depicts an exemplary graphical user interface 1000 generated by the server computing device 108 and displayed on the client device 102 for the purposes of displaying a simulated outcome for a particular annuity product recommendation. As shown in FIG. 10, the graphical user interface 1000 includes a series of sliders 1002 that enables the user to modify certain potential market conditions and see how those modified conditions affect the expected performance of the annuity product. As shown, the expected performance is displayed as one or more graphs/charts 1004 that show various performance results and indicators for the product. Risk Quantification and Hedging Strategies Another advantageous feature of the system 100 described herein connects an insurance company's investment and risk management systems to an artificial intelligence modeling process executed by the machine learning processor 112 in order to provide risk quantification and corresponding hedging strategy options to the company (e.g., post-sale of the annuity products to customers). To implement this connection, the machine learning processor 112 receives information specifying the risk management selection(s) of users and in response, processes the selection (s) and determines in relation to existing positions whether to modify the company's investment and risk management positions. The machine learning processor 112 executes the risk and hedging strategy module 113 that processes and determines the cost of risk management options for individual users or policyholders, then proceeds to develop distinct investment hedging strategies based upon the risk management cost in order to ensure that the insurance company can fulfill the product guarantees to its customers.

Figure 11:
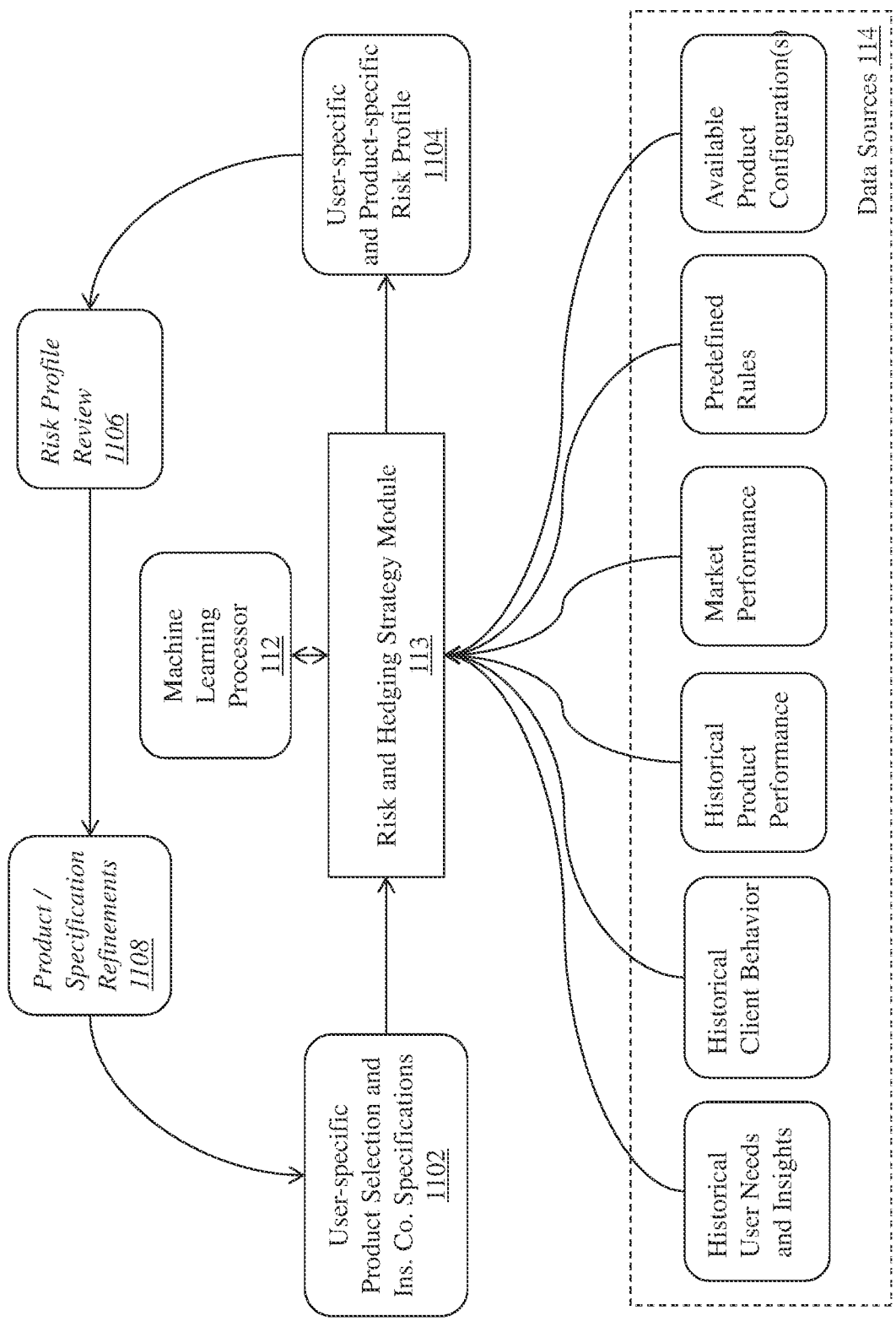
FIG. 11 is a workflow diagram of a method for generating a user-specific and product-specific risk profile using a machine learning processor executing a risk and hedging strategy module.

FIG. 11 is a workflow diagram of a method for generating a user-specific and product-specific risk profile using the system 100 of FIG. 1, specifically using the machine learning processor 112 to execute the risk and hedging strategy module 113. The machine learning processor 112 initializes the risk and hedging strategy module 113 with a user-specific annuity product selection (e.g., as purchased by the user) and with insurance company specifications 1102 relating to the annuity product. The machine learning processor 112 also collects specific input data elements from a variety of data sources 114, including historical user needs and insights (i.e., past outputs for the user as generated by the user needs assessment module 109), historical client behavior, historical annuity product performance, market performance (e.g., historical, current, projected), predefined rules, and one or more available annuity product configuration(s). The machine learning processor 112 executes the artificial intelligence algorithms of the risk and hedging strategy module 113 against a computer-generated risk quantification model to generate user-specific and product-specific risk profile data 1104 (e.g., target attributes and predicted values for anticipated investment and market risk specifically associated with the annuity product purchased by the user based upon traversal of the model).

At this stage, in some embodiments, the machine learning processor 112 captures the user-specific and product-specific risk profile data 1104 as output to determine an appropriate investment hedging strategy as will be explained below. In some embodiments, the machine learning processor 112 conducts a risk profile review and product/specification refinement process to adjust the risk profile data output and provide more accurate risk profile data. For example, the machine learning processor 112 executes a risk profile review process 1106 to validate the accuracy of the risk profile data generated by the module 113. In one embodiment, the machine learning processor 112 presents the risk profile data 1104 on a GUI associated with the client device 102, and the user at the client device 102 can validate or reject the risk profile data via user input. Next, the machine learning processor 112 receives the user feedback on the risk profile data and executes an annuity product/specification refinement process 1108 to automatically adjust the existing risk profile data (e.g., risk of loss in value of the investments associated with the annuity, investment strategies, risk tolerances, and so forth) and to generate additional user-specific product selection and insurance company specifications data to be used as an input data set for re-processing by the risk and hedging strategy module 113. In this way, the machine learning processor 112 can continuously execute the risk profile review and product/specification refinement process depicted in FIG. 11 in order to generate more accurate risk profile data and to refine the computer-generated risk quantification model for subsequent training and processing.

For example, the machine learning processor 112 can run granular risk analytics in real-time on the annuity product sold by the company to a user, or products sold to multiple users. Exemplary risk analytics include, but are not limited to: exposure to mortality, morbidity, surrenders, equity market, interest rates, and volatility. The risk analytics process also summarizes the implications of annuity product guarantees, rates of return, and risk management features of the annuities that have been sold by the insurance company-which are then incorporated into the user-specific and product-specific risk profile. It should be appreciated that the machine learning processor 112 can dynamically update the aggregated risk analytics using the risk and hedging strategy module 113 to incorporate newly-sold products, as well as changes in market conditions or actuarial expectations.

Once the machine learning processor 112 has developed a user-specific and product-specific risk profile 1104 using the risk and hedging strategy module 113, the machine learning module 112 can leverage the risk profile to generate one or more hedging strategies for the insurance company to mitigate the potential risk associated with the annuity products it has sold and to ensure that any guarantees for those products are met.

Figure 12:
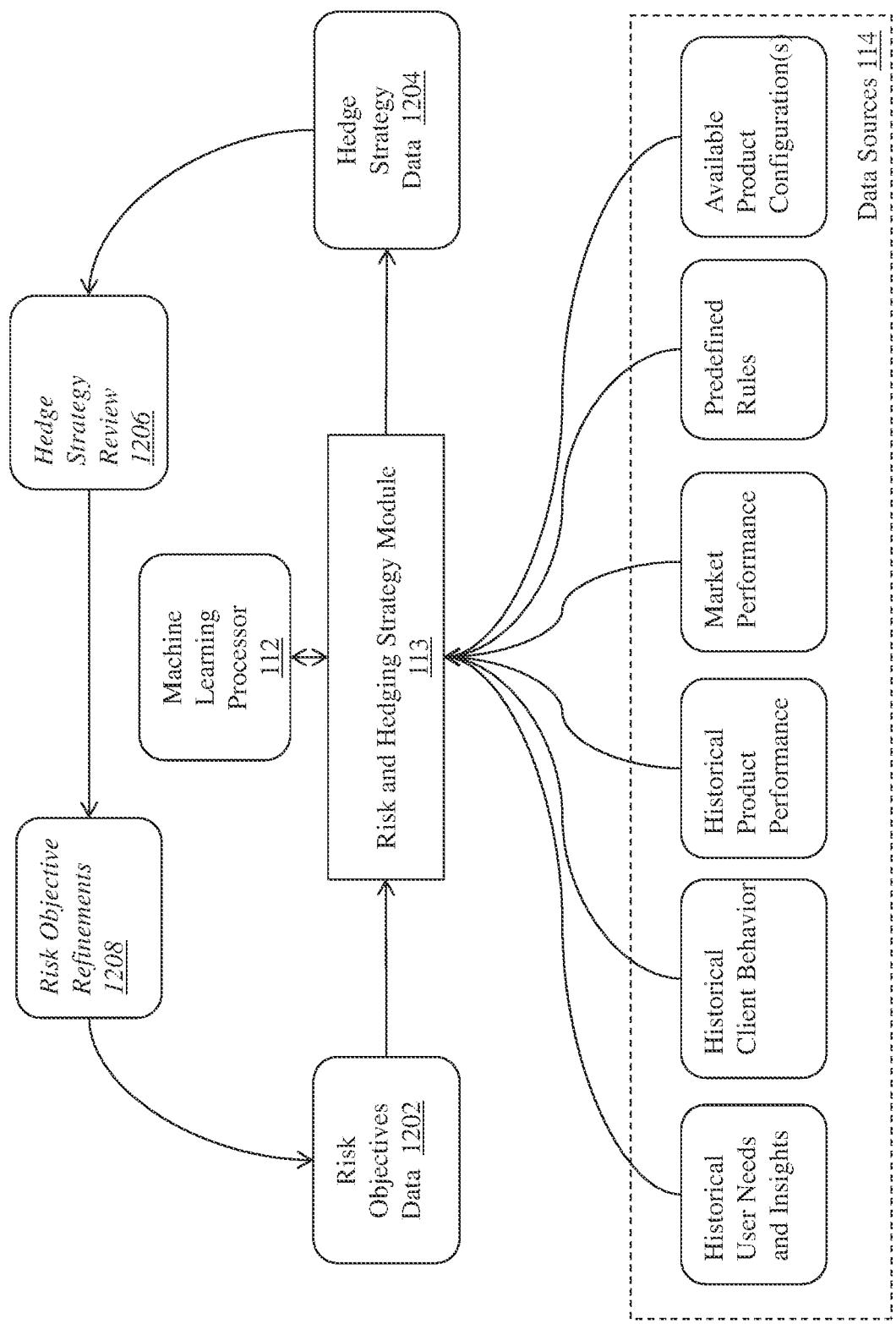
FIG. 12 is a workflow diagram of a method for generating hedge strategies using a machine learning pro-cessor execut-ing a risk and hedging strategy module.

FIG. 12 is a workflow diagram of a method for generating hedge strategies using the system 100 of FIG. 1, specifically using the machine learning processor 112 executing the risk and strategy hedging module 113. The machine learning processor 112 initializes the risk and hedging strategy module 113 with investment risk objectives data 1202 (e.g., as determined by the insurance company). The machine learning processor 112 also collects specific input data elements from a variety of data sources 114, including historical user needs and insights (i.e., past outputs for the user as generated by the user needs assessment module 109), historical client behavior, historical annuity product performance, market performance (e.g., historical, current, projected), predefined rules, and one or more available annuity product configuration(s). The machine learning processor 112 executes the artificial intelligence algorithms of the risk and hedging strategy module 113 against a computer-generated hedging strategy development model to generate hedge strategy data 1204 (e.g., target attributes and predicted values for potential investment hedges specifically associated with the annuity products purchased by users based upon traversal of the model).

In this step, the machine learning processor 112 takes insurance company objectives as input into the computer-generated hedging strategy development model and traverses the model with calculated analytics to propose a portfolio of financial instruments for the insurance company to use in hedging the annuity product risk as set forth in the risk profile. The proposed portfolio is based upon a deep database (e.g., database 106 of historical performance of a large set of financial instruments, which advantageously provides the technical advantage of back testing the proposed portfolio. The database 106 also contains detailed information about the universe of usable financial instruments that the insurance company can leverage for hedging.

At this stage, in some embodiments, the machine learning processor 112 captures the hedge strategy data 1204 as output for transmission to other computing systems of the insurance company to execute the hedging strategy (e.g., re-align assets, execute transactions, and the like). For example, the machine learning processor 112 connects to broker-dealer computer systems to provide real-time bids and/or offers on specific hedging instruments, which enables the insurance company to dynamically implement its hedging program.

In some embodiments, the machine learning processor 112 conducts a hedge strategy review and risk objective refinement process to adjust the hedge strategy data output and provide more accurate hedge strategy data. For example, the machine learning processor 112 executes a hedge strategy review process 1206 to validate the accuracy of the hedge strategy data generated by the module 113. In one embodiment, the machine learning processor 112 presents the hedge strategy data 1204 on a GUI associated with the client device 102, and the user at the client device 102 can validate or reject the hedge strategy data via user input. Next, the machine learning processor 112 receives the user feedback on the risk profile data and executes a risk objective refinement process 1208 to automatically adjust the existing hedge strategy data and to generate additional and risk objectives data to be used as an input data set for re-processing by the risk and hedging strategy module 113. In this way, the machine learning processor 112 can continuously execute the hedging strategy review and risk objective refinement process depicted in FIG. 12 in order to generate more accurate hedging strategy data and to refine the computer-generated hedging strategy development model for subsequent training and processing.

It should be appreciated that the feedback loop described in FIG. 12 (i.e., continuously collecting risk and investment data and returning hedging strategies) provides the technical advantage of incremental improvement over time to the predictive machine learning process and the computer-generated model of generating hedging strategies (i.e., did the hedges achieve the insurance company's objectives as expected?). Over time, the machine learning processor 112 integrates more granular segments of hedging strategies into the model, for an even more multi-faceted and dimensional model.

Method steps can be performed by one or more special-purpose processors executing a computer program to perform functions of the invention by operating on input data and/or generating output data. Method steps can also be performed by, and an apparatus can be implemented as, special-purpose logic circuitry, e.g., a FPGA (field programmable gate array), a FPAA (field-programmable analog array), a CPLD (complex programmable logic device), a PSoC (Programmable System-on-Chip), ASIP (application specific instruction-set processor), or an ASIC (application specific integrated circuit), or the like. Subroutines can refer to portions of the stored computer program and/or the processor, and/or the special circuitry that implement one or more functions.

Processors suitable for the execution of a computer program include, by way of example, special-purpose microprocessors. Generally, a processor receives instructions and data from a read-only memory or a random access memory or both. The essential elements of a computer are a specialized processor for executing instructions and one or more specifically-allocated memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system comprising:
a server computing device communicably coupled to a database computing device and having a machine learning processor, the server computing device programmed to:
build, by the machine learning processor, a computer-generated annuity matching model by training a machine learning algorithm programmed on the machine learning processor against a training data set, and automatically assimilating newly collected input data elements into the annuity matching model;
generate an input data set by:
determining a set of user information associated with a user, including user demographics, user risk preferences, and user objectives;
applying the set of user information to a user insight analysis model to generate one or more user-specific insights;
presenting the one or more user-specific insights to the user;
receiving user feedback confirming or rejecting the one or more user-specific insights;
automatically retraining the user insight analysis model based on the user feedback; and
determining one or more available annuity products;
apply the confirmed the one or more user-specific insights and the one or more available annuity products to a price optimization module executed by the machine learning processor to traverse the computer-generated annuity matching model to select a subset of the one or more available annuity products that are associated with product characteristics that match one more of the user-specific insights and generate one or more annuity product recommendations for the user based upon the subset of annuity products;
execute, by the machine learning processor, a market simulation module to traverse a computer-generated annuity performance prediction model using the subset of annuity products selected by the price optimization module and one or more predictions of market performance the market simulation module generating one or more simulated outcomes by applying the one or more predictions of market performance to each of the annuity products in the subset of annuity products; and
transmit the one or more annuity product recommendations and the one or more simulated outcomes to a client computing device communicably coupled to the server computing device, causing the client computing device to:
generate a graphical user interface for display to the user via a display device, the graphical user interface including one or more visual representations of each of the one or more annuity product recommendations and the one or more simulated outcomes.

2. The system of claim 1, wherein the input data set is generated by retrieving at least a portion of the user information and the available annuity products from an external data source.

3. The system of claim 1, wherein the server computing device is further configured to receive at least a portion of the user information from the user.

4. The system of claim 1, wherein the graphical user interface includes one or more input controls to enable interaction with and manipulation of the one or more visual representations by the user of the client computing device.

5. The system of claim 1, wherein the input data set comprises a plurality of data elements that specifically pertain to the user for whom the system is generating annuity product recommendations.

6. The system of claim 1, the server computing device further configured to build, by the machine learning processor, the computer-generated annuity performance prediction model by training the machine learning algorithm programmed on the machine learning processor using a portion of the input data set.

7. The system of claim 1, wherein the product characteristics are reference market indices, participation rate, downside protection, commitment term, income benefits, or fees.

8. The system of claim 1, wherein the user risk preferences include a risk tolerance.

9. The system of claim 1, wherein the one or more predictions of market performance include at least one prediction of market performance received from the client computing device as input by the user.

10. The system of claim 1, wherein the one or more predictions of market performance correspond to a performance of one or more market indices.

11. The system of claim 1, wherein the one or more simulated outcomes each of the annuity products correspond to an expected rate of return for the annuity product.

12. The system of claim 1, wherein the server computing device is further programmed to:
receive second user feedback on at least one of the one or more visual representations of each of the one or more annuity product recommendations;
apply the second user feedback as further input to the price optimization module to select at least one other available annuity product; and
re-execute the market simulation module to apply the one or more predictions of market performance to at least one other available annuity product.

13. The system of claim 12, wherein the second user feedback comprises an indication that features of the annuity product recommendations do not meet the needs of the user.

14. The system of claim 12, wherein the server computing device is further programmed to calibrate the computer-generated annuity matching model using the second user feedback.

15. The system of claim 1, wherein the server computing device is further programmed to receive the one or more market performance prediction values from the client computing device.

16. A method comprising:
generating, by a server computing device communicably coupled to a database and having a machine learning processor, an input data set by:
determining a set of user information associated with a user, including user demographics, user risk preferences, and user objectives; and
determining one or more available annuity products;
building, by the machine learning processor, a computer-generated annuity matching model by training a machine learning algorithm programmed on the machine learning processor against a training data set, and automatically assimilating newly collected input data elements into the annuity matching model by:
applying the set of user information to a user insight analysis model to generate one or more user-specific insights;
presenting the one or more user-specific insights to the user;
receiving user feedback confirming or rejecting the one or more user-specific insights; and
automatically retraining the user insight analysis model based on the user feedback;
applying the confirmed the one or more user-specific insights and the one or more available annuity products to a price optimization engine executed by the machine learning processor to traverse the computer-generated annuity matching model to select a subset of the one or more available annuity products that are associated with product characteristics that match one or more of the user-specific insights and generate one or more annuity product recommendations the user based upon the subset of annuity products;
executing, by the machine learning processor, a market simulation engine to traverse a computer-generated annuity performance prediction model using the subset of annuity products selected by the price optimization engine and one or more predictions of market performance, the market simulation engine generating one or more simulated outcomes by applying the one or more predictions of market performance to each of the annuity products in the subset of annuity products; and
transmitting the one or more annuity product recommendations and the one or more simulated outcomes to a client computing device communicably coupled to the server computing device, causing the client computing device to:
generate a graphical user interface for display to the user via a display device, the graphical user interface including one or more visual representations of each of the one or more annuity product recommendations and the one or more simulated outcomes.

17. The method of claim 16, wherein the input data set is generated by retrieving at least a portion of the user information and the available annuity products from an external data source.

18. The method of claim 16, wherein the server computing device receives at least a portion of the user information from the user.

19. The method of claim 16, wherein the graphical user interface includes one or more input controls to enable interaction with and manipulation of the one or more visual representations by the user of the client computing device.

20. The method of claim 16, wherein the input data set comprises a plurality of data elements that specifically pertain to the user for whom the system is generating annuity product recommendations.

21. The method of claim 16, wherein the product characteristics are reference market indices, participation rate, downside protection, commitment term, income benefits, or fees.

22. The method of claim 16, wherein the user risk preferences include a risk tolerance.

23. The method of claim 16, wherein the one or more predictions of market performance include at least one prediction of market performance received from the client computing device as input by the user.

24. The method of claim 16, wherein the one or more predictions of market performance correspond to a performance of one or more market indices.

25. The method of claim 16, wherein the one or more simulated outcomes for each of the annuity products correspond to an expected rate of return for the annuity product.

26. The method of claim 16, further comprising:
receiving second user feedback on at least one of the one or more visual representations of each of the one or more annuity product recommendations;
applying the second user feedback as further input to the price optimization engine to select at least one other available annuity product; and
re-executing the market simulation engine to apply the one or more predictions of market performance to at least one other available annuity product.

27. The method of claim 26, wherein the second user feedback comprises an indication that features of the annuity product recommendations do not meet the needs of the user.

28. The method of claim 26, further comprising calibrating the computer-generated annuity matching model using the second user feedback.

29. The method of claim 16, further comprising receiving the one or more market performance prediction values from the client computing device.

* * * * *